United States Patent
Connolly et al.

(10) Patent No.: US 7,490,057 B2
(45) Date of Patent: Feb. 10, 2009

(54) PRODUCT MARKETING SYSTEM AND METHOD

(75) Inventors: James M. Connolly, Reading, MA (US); Brian D. Hanechak, Waltham, MA (US); Kenneth A. Walker, Jr., Bolton, MA (US); Robert L. Dulaney, Paxton, MA (US)

(73) Assignee: Vista Print Technologies Limited, Hamilton (BM)

( * ) Notice: Subject to any disclaimer, the term of this patent is extended or adjusted under 35 U.S.C. 154(b) by 203 days.

(21) Appl. No.: 11/056,304

(22) Filed: Feb. 11, 2005

(65) Prior Publication Data

US 2006/0184424 A1    Aug. 17, 2006

(51) Int. Cl.
*G06Q 30/00*    (2006.01)
*G06Q 17/30*    (2006.01)

(52) U.S. Cl. ........................................ 705/26
(58) Field of Classification Search .............. 705/26–27
See application file for complete search history.

(56) References Cited

U.S. PATENT DOCUMENTS

| | | | |
|---|---|---|---|
| 7,216,092 B1 * | 5/2007 | Weber et al. ................. | 705/26 |
| 2003/0023490 A1 * | 1/2003 | Lenyon et al. ................ | 705/14 |
| 2004/0215479 A1 * | 10/2004 | Dorsey et al. ................. | 705/1 |

OTHER PUBLICATIONS

Vistaprint.com, http://web.archive.org/web/*/www.vistaprint.com, <retrieved via WayBackMachine.org>, Retrieved on Dec. 15, 2006, Initially published on Jun. 19, 2000.*
Dewan, Rajiv; Jing, Bing; Seidmann, Abraham; "One-to-one Marketing on the Internet", Proceedings of the 20th international conference on Information Systems, 1999.*
Vistaprint, "March Mardness", email to U.S. customers, Mar. 2003.
Vistaprint, "Exclusive Offer for Select Customers", email to U.S. customers, Jul. 2003.
Vistaprint, "Hot Summer Deals Extended", email to U.S. customers, Aug. 2003.
Vistaprint, "Buy Our Premium Business Cards Today and Save 50%", email to U.S. customers, Oct. 2003.
Vistaprint, "Put Your Business Over the Top", email to U.S. customers, Dec. 2003.

* cited by examiner

*Primary Examiner*—Jeffrey A. Smith
*Assistant Examiner*—Kalyan Deshpande
(74) *Attorney, Agent, or Firm*—Robert L. Dulaney; Jessica J. Costa

(57) ABSTRACT

Computer-implemented systems and method for generating personalized email communications soliciting orders of custom products. Product reorder candidates are identified from customer records and a personalized email order solicitation is sent to the customer. The email is adapted to display an image of the customer's previously designed custom product, either exactly as originally designed or, if appropriate, as automatically updated prior to displaying to the user.

34 Claims, 4 Drawing Sheets

PRODUCT MARKETING SYSTEM AND METHOD

FIELD OF THE INVENTION

The present invention relates to electronic communications and more particularly to personalized electronic communications for marketing and promotion purposes.

BACKGROUND

Web-based providers of custom products, taking advantage of the capabilities of the World Wide Web and modern Web browsers, operate Web sites that provide online design services for user's desiring to create customized materials from any computer with web access at whatever time and place is convenient to the user. These service providers typically provide their customers with the ability to access the service provider's Web site, view product templates, and use software tools provided by the site to select a template, add images, text, or other content, and perform various modifications to create a customized product design. After the product has been designed by the user, Web-based service providers also typically allow the user to place an order for the production and delivery to the user's home or business of quantities of high quality, printed products of the type that the user is not capable of producing with the printer systems typically connected to most personal computer systems.

Many printed products, such as business cards, letterhead, promotional brochures, holiday cards, and the like, are intended to be distributed or otherwise consumed by the purchasing party and, therefore, will need to be replenished from time to time. In addition, some printing service providers make calendars, sports team schedules, list of holidays, or other similar content available for their customers to incorporate, if desired, into a custom product. Products incorporating this type of content have a particular window of usefulness and become outdated after a period of time. New supplies of the product with up-to-date content need to be ordered periodically. Customers that fail to reorder materials in a timely manner may not have enough products on hand when a need arises or may be required to pay substantial additional shipping or other costs for expedited production and delivery.

If a product vendor sends reorder reminders at all to its customer base, the reminders, like most promotional communications by a vendor to its customer base, are generally in the form of bulk, standardized emails sent to all or a substantial portion of the vendor's customer base with little or no targeting of the specific history or needs of individual customers. Response rates to bulk, general email campaigns are typically low and vendors run the risk of alienating their customer base by repetitively sending email solicitations that are of little or no interest to many of their customers. Even for those customers who are actually interested in the product or other offer being promoted, traditional bulk non-personalized email campaigns typically do not do a good job of engaging the email recipient or of facilitating the ability of the recipient to place an order for the product with a minimum of research and effort.

There is, therefore, a need for a novel system and method for personalized electronic solicitation that identifies relevant customers, presents the customers with the relevant product information needed to make an immediate purchase decision, and facilitates quick and easy ordering by streamlining the customer purchase process.

SUMMARY

The present invention is directed at satisfying the need for systems and methods that provide a personalized email experience.

Customer order information is searched based on search parameters selected by the product vendor, such as, for example, product type, date of most recent order of the product, and anticipated upcoming customer need. If a product meets the search criteria, an email message is sent to the email address associated with the product. The email includes an image of the customer's personalized product design, either exactly as the design was previously created by the customer or as modified automatically by the vendor system to incorporate new content to replace previously incorporated material that is now outdated or obsolete.

When the email is successfully opened at the customer's computer, the customer is presented with the customized product image and with links allowing the customer to either proceed directly to the product ordering section of the vendor's site to complete the order or to the design editing section of the vendor's site where the customer can, if desired, modify the product design prior to placing a purchase order.

DESCRIPTION

Figure 1:
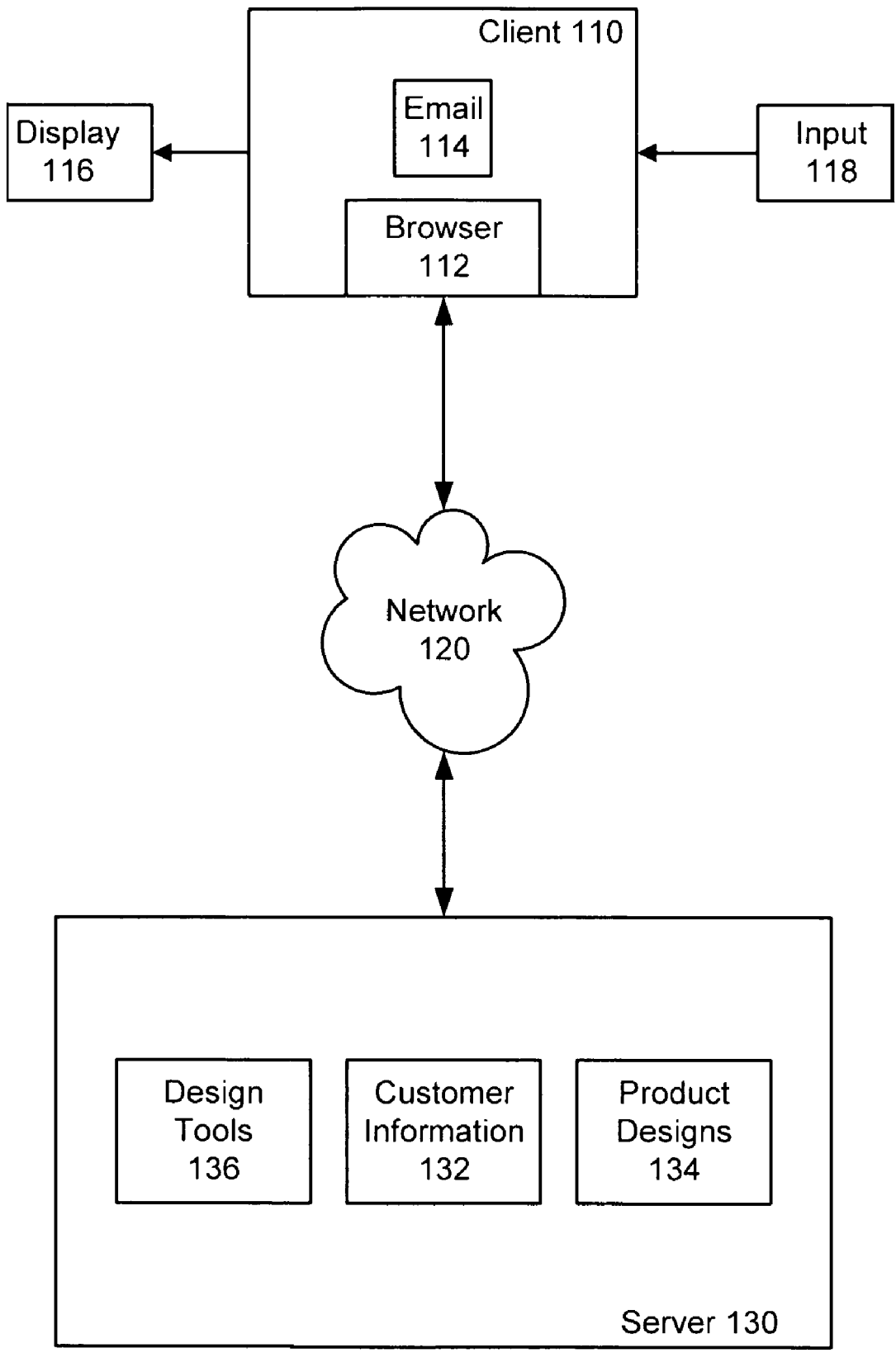
FIG. 1 is a schematic representation of a system with which the invention can be employed.

Referring to FIG. 1, client 110 is a typically equipped personal computer, portable computer, or other system capable of communicating via network 120, such as the Web, with remote server systems, such as server 130, and capable of executing a web browser program 112 and an email program 114. The client 110 system also includes a user display 116 capable of displaying text, images, and graphics to a user of the system and one or more user data input devices 118, such as a keyboard and a mouse.

Server 130 is the web site computing and support system of a vendor of customized products. In the following discussion, a custom printed product vendor site that allows users of the site to design and purchase personalized printed products using online software tools available at the site, such as VistaPrint.com operated by VistaPrint Limited, will be discussed, but it will be understood that the invention is not so limited. While server 130 is depicted in FIG. 1 as a single block, it will be understood that server 130 will typically be comprised of multiple servers, data storage systems, and other equipment and devices configured to communicate and operate cooperatively to support the operations of the site.

In the embodiment shown in FIG. 1, the memory system of server 130, which could be comprised of multiple separate storage systems and devices, retains customer information 132 and product designs 134. It will be understood that these are representative of one possible embodiment and other embodiments using different memory organizations or techniques could be employed. Product designs 134 contains the various pre-designed images, layouts, graphics, color schemes, and other content and materials provided for use by site users in preparing custom products. These various elements are retained such that they can be individually selected and combined with the text or other content provided by the user to create a personalized electronic product design. Also within product design information 134 the electronic designs of customers' customized products are retained as separately stored component elements, such as text, layouts, images, graphics, fonts, and organizational and relational information that collectively comprise the product description necessary to allow product components in product design information 134 to be identified, retrieved, and assembled to create a customer's personalized product. Product design information 134 may also contain one or more stored images of the customer product design, such as a high resolution product image suitable for printing on a high quality printing system and one or more low resolution images suitable for displaying on the user's display system. Electronic product design systems allowing a user to create a personalized electronic product design using separately stored layouts, images, and other component elements are described in co-owned and co-pending applications Ser. No. 10/449836, entitled Electronic Document Modification, and Ser. No. 10/646554, entitled Automated Image Resizing and Cropping, which are hereby incorporated herein by reference.

Customer order information 132 contains the data retained by the vendor in connection with each custom design retained in product designs 134. Each custom product design is associated with a unique product design identifier as well as other related information, such as the product type, quantity ordered, date shipped, shipping address, billing address, the customer's account identifier, and so forth.

As mentioned above, some types of custom products will, by their nature, tend to be wanted by customers at more or less predictable times. While usage rates of printed products vary widely and may be subject to unexpected changes, vendors of printed products with sufficient data and experience can, based on analysis of individual or aggregate customer reordering history, make a reasonably informed estimate of when the quantity of product previously ordered may be approaching exhaustion and send an appropriate reorder solicitation that, the vendor hopes, is received at a time when the customer is receptive and ready to reorder.

For time-sensitive content in the product design, the vendor can fairly reliably predict an appropriate reorder time frame. For example, a customer who previously purchased customized products promoting the customer's business, such as postcards, magnets, or the like, containing a calendar or a team schedule, would be well served by receiving an email at an appropriate time prior to be beginning of the following calendar year or team season that serves not only as a timely reminder to order a new version of the product, but that displays an automatically updated image of the new product with the new calendar, team schedule, or other new content as appropriate, that is ready to order with a minimum of required customer input.

Some web-based printing service providers operate on a self-service basis while others offer at least some live help or advice via a telephone, instant messaging, or other means. If a vendor representative is involved, during the course of assisting the customer, the representative may gather information regarding the expected use of the materials being prepared. In the embodiment described herein, the representative has the option of adding a searchable estimated reorder time field to the information associated with the design in customer order information 132. The reorder time value could be implemented as an estimated number of weeks or months until the customer may wish to reorder that product, or as a specific future reorder date, or in other manners.

Figure 2:
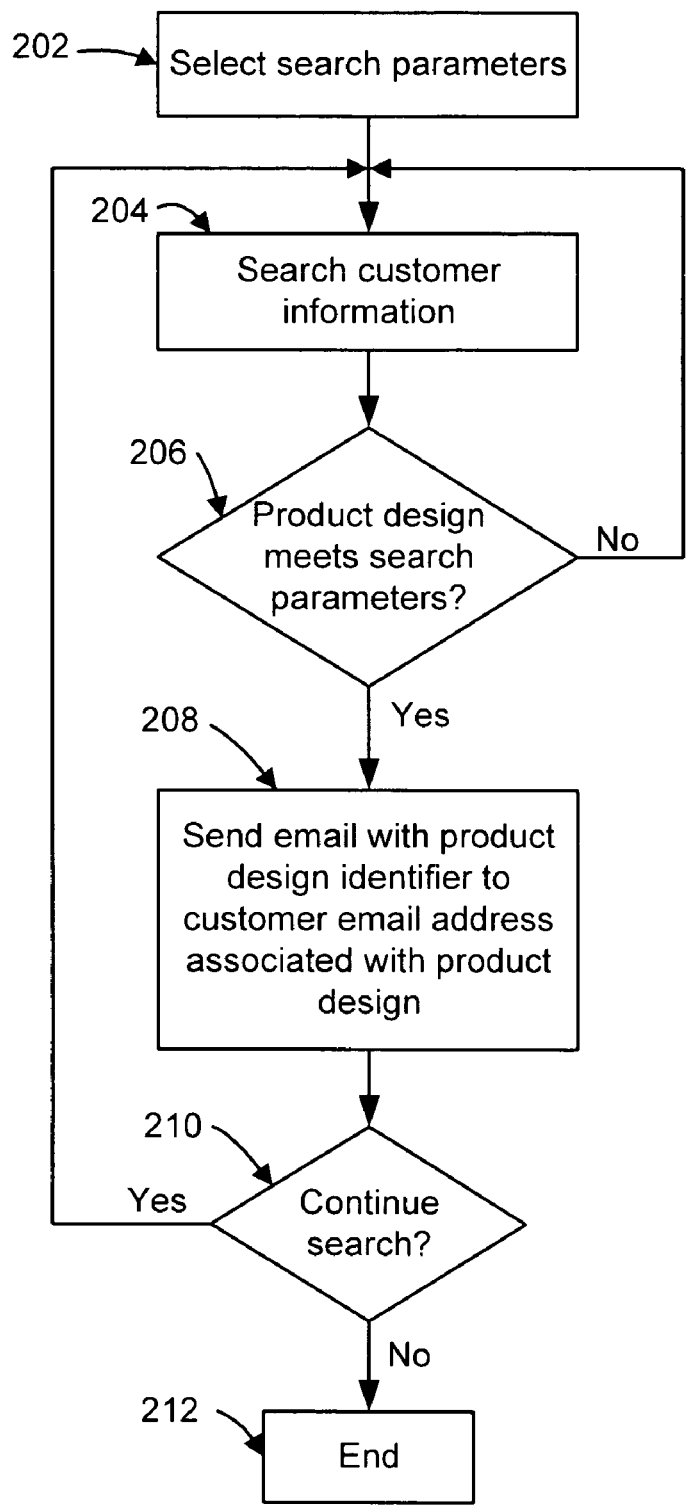
FIG. 2 is a flow chart showing a representative method for generating personalized electronic solicitations.

Referring to FIG. 2, a representative method for generating personalized electronic communications will be discussed. When the vendor decides to initiate a customized promotional email campaign, the vendor identifies at step 202 the one or more search parameters to be used to identify customers that qualify to receive the email. Selecting email recipients from the vendor's customer base according to specific search parameters allows the vendor to target the emails to relevant customers. As mentioned above, search parameters could include product type, order date, order quantity, product content, or any other factor that would tend to cause some customers to desire, or be required, to reorder or update previously ordered printed products.

At step 204, a search of customer information 132 to identify appropriate recipients for the email is performed. Some searches could be executed individually on an ad hoc basis while other searches could be set up to run routinely on a weekly, daily, or other predetermined schedule or frequency as desired by the vendor.

If a product is identified at step 206 as meeting the selection criteria, at step 208 the email address associated with the customer account for that product is retrieved from customer information 132 and an email is prepared and sent to that email address. The email incorporates the unique product design identifier of the qualifying product. As will be discussed in more detail below, the product identifier is used later to personalize the email image displayed to the user of client 110. At step 210, if the search has not been completed, steps 206 and 208 are repeated. When the search has been completed or otherwise terminated by the vendor, the process will end at step 214.

The method depicted in FIG. 2 shows the preparing and sending of emails to identified customers occurring while the search is in progress. This is not essential and the method could be implemented in alternate ways. For example, the search of customer information could first be completed to compile a list of qualifying products with the emails generated independently as a separate process at a later time.

Figure 3:
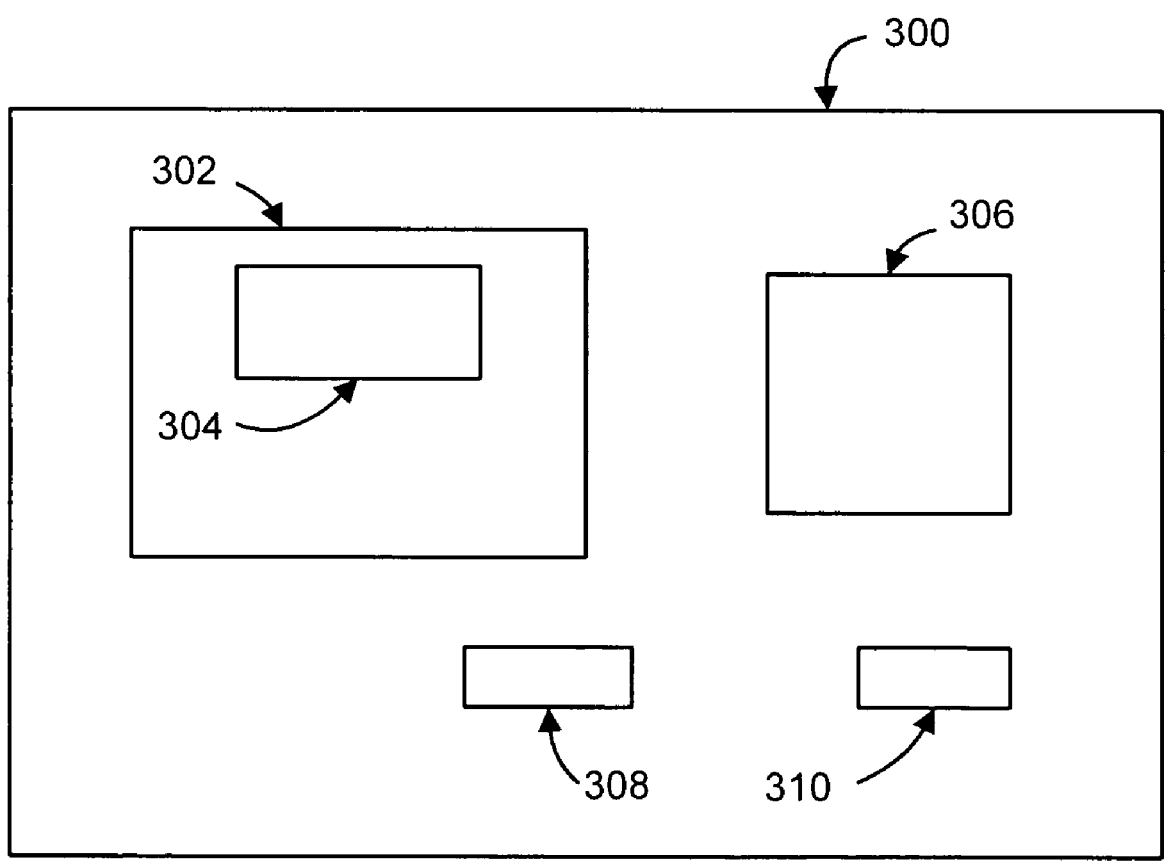
FIG. 3 is a schematic depiction of an embodiment of an email message.

Referring to FIG. 3, a simplified depiction of the elements of a representative personalized email message 300 will be discussed. In the disclosed embodiment, the vendor designs email 300 to display an image of the customer's previously prepared personalized custom product, indicated by product image area 302. Depending on the product being promoted by the vendor, image area 302 could be an image of a business card, postcard, letterhead, return address label, or any other customized product offered by the vendor.

For various reasons, many emails are never received by the intended recipient or, if received, are never opened. In the disclosed embodiment, to avoid the processing load at server 130 that would be associated with preparing design images for emails that are never received or opened, the image of the customer's personalized product is not made a part of the email transmitted at step 208. Customized image area 302 is occupied initially by a generic placeholder image with an informational message to the user such as "Please wait while your image loads". As discussed below, if and when the email is opened by the recipient, the placeholder image at 302 will be replaced with the customer's product image, creating a personalized promotional experience for the recipient. As an alternative embodiment, if processing load at the server is not an issue or concern, the image of the customized product could be created and attached to the email as originally transmitted.

As mentioned above, the customer may optionally have incorporated vendor-provided time-sensitive content, such as a calendar, a team schedule, or a list of holidays, into the customer's personalized product design. This type of content, if present in a particular customer's product design, is represented as content area 304.

Email 300 will also typically include one or more areas of text and graphics, represented collectively shown in FIG. 3 as message content area 306, containing information relative to the specific offer or promotion being made in the email. Active link 308 allows the customer, if desired, to initiate the purchase process for the promoted product. Server 130 will respond to user activation of link 308 by opening a new browser window displaying the vendor's product purchase page, thereby allowing the user to immediately and easily commence the product ordering process. In some cases, the customer may wish to modify the product design prior to ordering. Active link 310 allows the customer, if desired, to initiate the product design edit process for the displayed product image. Server 130 will respond to user activation of link 310 by opening a new browser window displaying the product image on a product design editing page, allowing the user to immediately and easily initiate one or more modifications to the design, as desired, prior to commencing the product purchase process.

The above-described elements of email 300 may be sized and arranged within email 300 as desired by the vendor. The vendor may also incorporate various other content into email 300 for aesthetic or informational purposes, such as additional images, graphics, text, logos, and links. Because the typical vendor offers a variety of products of various sizes and shapes and because each promotion may vary in terms and duration, the vendor will typically prepare different email content and layout for each different type of promotion. After a design and format for a particular product promotion is selected, all emails sent to customers identified in the search for that promotion will be substantially identical except that each email will have associated therewith a specific product identifier associated with the specific recipient of the email that will be used by server 130 to customize the email image with the email recipient's personalized product image.

Figure 4:
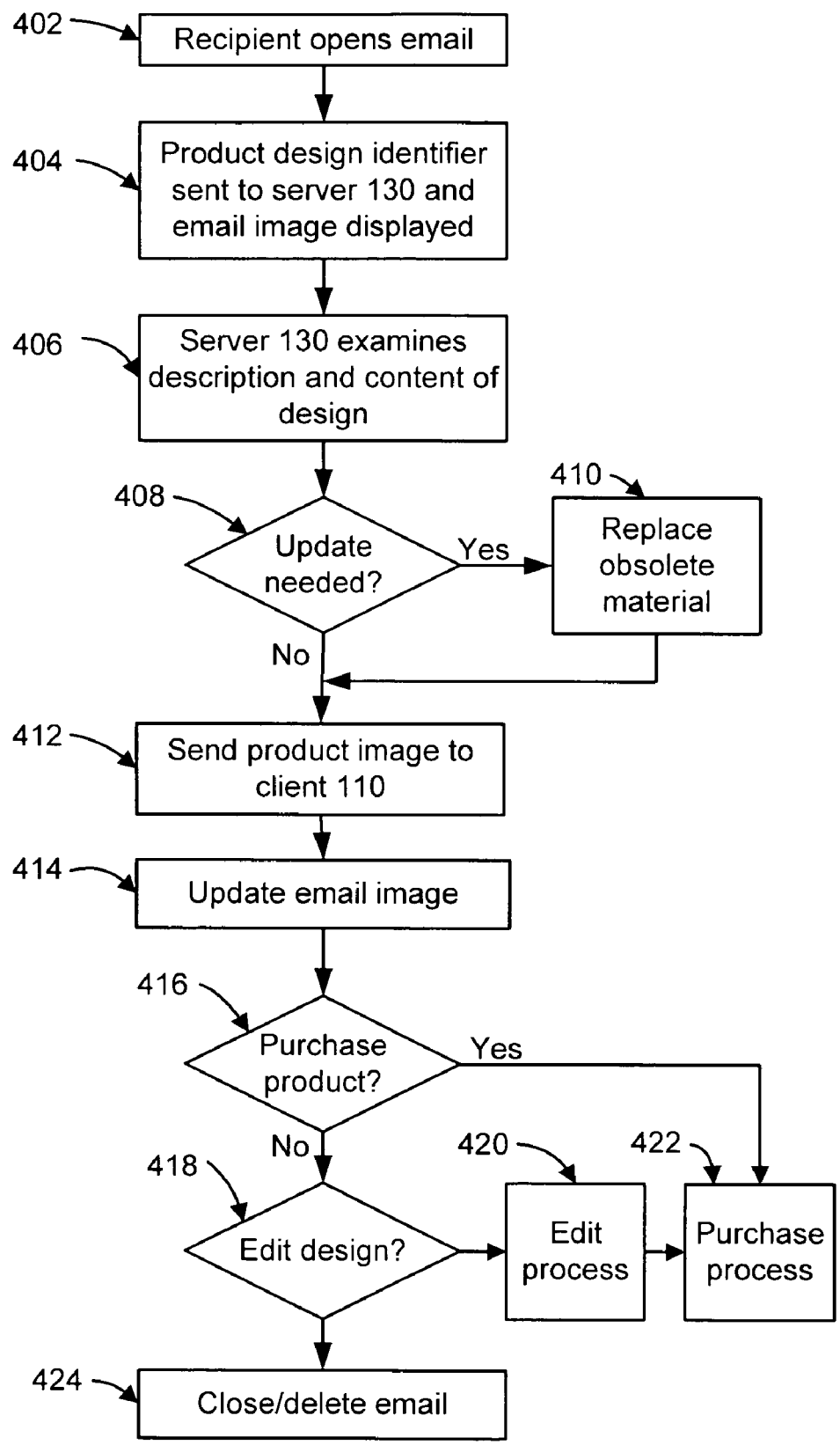
FIG. 4 is a flow chart showing a representative method for processing an electronic solicitation opened by a recipient.

Referring now to FIG. 4, a representative method for presenting a personalized promotional email at client system 110 will be discussed. At step 402, the user at client 110 opens the received email. At step 404, in response to the user's action, the product identifier from the email is returned to server 130 and the email 300 image is displayed to the user on display 116.

At step 406, when server 130 receives the product identifier from client 110, server 130 examines the component elements of the product design corresponding to the received product identifier received from client 100. At step 408, a determination is made regarding whether an update to the stored product design should be performed prior to sending the email. Some emails may be for straight reorders of products that do not require any modification prior to the reorder being placed while other emails may be for products that need to be updated with current information. For a product requiring no modification, a low-resolution display image of the stored product design suitable for displaying to the user on display 116 is sent to client 110 at step 412.

If the product is identified as containing component content that is obsolete or otherwise needs to be replaced, substitute content identified by the vendor will be retrieved from product designs 134 and the product design will be updated to replace the obsolete component element with the corresponding replacement element at step 410. For example, if content item 304 in the retained product design is a vendor-prepared image of a calendar for a year that is completely or substantially over, server 130 will automatically delete the old calendar component image and substitute a replacement content image for the next calendar year as content element 304 prior to preparing and sending the display image to client 110 at step 412 for incorporation into email 300. Because the product design is constructed from component elements, new or substitute vendor-supplied content elements can be readily changed by the vendor as appropriate.

As mentioned above, the presently disclosed embodiment performs the steps 406-414, related to updating of the custom image, only after the associated email is opened. This avoids incurring unnecessary processor workload that would arise from performing image processing for emails that are never received or opened. As an alternate embodiment, if processor workload is not a concern or issue, steps 406-410 could be performed after step 206 before the email is sent and steps 406-414 could be eliminated from the process shown in FIG. 4.

At step 414, email image 300 is updated to replace the generic placeholder image that originally occupied the image 302 area with the customer's personalized product image received from server 130. After reviewing the content of the email, the customer may decide to place an order for the product exactly as it is displayed in the email, may decide to place an order for the product after one or more edits have been made to the product design, or may decide to delete or close the email. As discussed above, in the disclosed embodiment the email contains a purchase link and an edit link to increase user flexibility. At step 416, if the customer clicks on the purchase link in links 308, a new browser window will be opened and server 130 will display an appropriate page to allow the customer to being the purchase process at step 422. At step 418, if the customer instead selects the edit link from links 308, a new browser window will be opened and server 130 will display an appropriate edit page for the customer to enter the edit process at step 420. When the customer has edited the design as desired, the customer can proceed to the purchase process 422. The vendor may choose to incorporate a login process into edit process 420 or purchase process 422 to verify the identity and authority of the customer.

Of course, not all customers will choose to accept or pursue the offer. After reviewing the email contents, at step 424 some customers may choose to delete the email or close it for later review and consideration.

While an exemplary embodiment of the invention has been discussed, the described embodiment is to be considered as illustrative rather than restrictive. The scope of the invention is as indicated in the following claims and all equivalent methods and systems.

What is claimed is:

1. A computer-implemented method of soliciting a new order for a product previously ordered by a customer, the method comprising retaining customer account information associated with the customer, the account information including at least an email address associated with the customer, retaining in electronic form a customized design of a product previously ordered by the customer, the retained customized design being associated wit the customer account of the customer, and without customer request, sending an email to the email address associated with the customer account associated with the retained customized design, the email displaying at least an image of the previously ordered product, a promotional message soliciting a new order for the product, and at least one link allowing the recipient of the email to indicate interest in placing an order.

2. The method of claim 1 wherein the image of the product is sent to the customer's computer only after the email has been opened.

3. The method of claim 1 further comprising allowing the customer to initiate a purchase process for the product as displayed and receiving an order for the product from the customer.

4. The method of claim 1 further comprising allowing the customer to initiate an edit process such that the customer can make one or more changes to the design of the product and receiving an order for a modified version of the product after the customer has made one or more changes to the design of the previously ordered product.

5. The method of claim 1 further comprising estimating a time period when the customer will be interested in placing a new order for the previously ordered product and sending the email during that time period.

6. The method of claim 5 wherein the customer account includes information related to the previously ordered product and wherein estimating the time period is based on at least some information in the customer account.

7. The method of claim 6 wherein the information in the customer account related to the previous order for the product comprises information identifying the product type, the date of the previous order, and quantity of the product previously ordered.

8. One or more computer readable media encoded with computer executable instructions for executing the method of claim 1.

9. A computer-implemented method of soliciting an order for a modified version of a product previously ordered by a customer, the method comprising
- retaining customer account information associated with the customer, the account information including at least an email address associated with the customer,
- retaining in electronic form a customized design of a product previously ordered by the customer, the retained customized design being associated with the customer account of the customer,
- without customer request, modifying the customized design of the previously ordered product by replacing at least a portion of the customized product design content with different content to create a modified version of the customized product design, and
- sending an email to the email address associated with the customer account associated with the previously ordered product, the email displaying at least an image of the modified product, a promotional message soliciting an order for the modified product, and at least one link allowing the recipient of the email to indicate interest in placing an order.

10. The method of claim 9 wherein the product design is modified only after the email is opened.

11. The method of claim 9 wherein the product design is modified prior to sending the email.

12. The method of claim 9 wherein modifying the product design comprises replacing time-related content in the previously ordered product design that has become at least partially obsolete since the date the previous product was ordered.

13. The method of claim 12 wherein the email is sent at a time that is estimated to be during a time period when the customer will be interested in placing a new order for a modified product updated with different time-related content.

14. The method of claim 12 wherein the time-related content that is replaced in the product design is selected from the group comprising a calendar, a schedule of events, and a list of holidays.

15. The method of claim 9 wherein the image of the modified product is sent to the customer's computer only after the email has been opened.

16. The method of claim 9 further comprising allowing the customer to initiate a purchase process for the modified product and receiving an order for the modified product from the customer.

17. The method of claim 9 further comprising allowing the customer to initiate an edit process such that the customer can make one or more changes to the modified design of the product and receiving an order for a revised version of the modified product after the user has made one or more changes to the design of the modified product.

18. One or more computer readable media encoded with computer executable instructions which, when executed by a computer, implement a method of soliciting an order for a modified version of a product previously ordered by a customer, the method comprising
- retaining customer account information associated with the customer, the account information including at least an email address associated with the customer,
- retaining in electronic form a customized design of a product previously ordered by the customer, the retained customized design being associated with the customer account of the customer,
- without customer request, modifying the customized design of the previously ordered product by replacing at least a portion of the customized product design content with different content to create a modified version of the customized product design, and
- sending an email to the email address associated with the customer account associated with the previously ordered product, the email displaying at least an image of the modified product, a promotional message soliciting an order for the modified product, and at least one link allowing the recipient of the email to indicate interest in placing an order.

19. A computer-implemented method of soliciting new orders for products previously ordered by customers, the method comprising
- retaining individual customer account information for a plurality of customers, the account information for each customer including at least an email address associated with the customer,
- retaining in electronic form a plurality of customized product designs for products previously ordered by the customers, each customized product design being associated with an individual customer account,
- searching the customer account information of at least a portion of the plurality of customers to identify one or more previously ordered products for which a new order will be solicited, and
- for each identified product from the one or more previously ordered products, sending an email to the email address associated with the customer account associated with the identified product, the email displaying at least an image of the identified product, a promotional message soliciting a new order for the identified product, and at least one link allowing the customer to indicate interest in placing an order.

20. The method of claim 19 wherein the image of the identified product is sent to the customer's computer only after the email has been opened.

21. The method of claim 19 further comprising allowing a customer to initiate a purchase process for the identified product and receiving an order for the identified product from the customer.

22. The method of claim 19 further comprising allowing the customer to initiate an edit process such that the customer can make one or more changes to the product design of the identified product to create a modified design for a modified product and receiving an order for the modified product.

23. The method of claim 19 wherein the customer account information for each customer further includes at least the date of the previous product order and wherein searching the customer account information comprises searching at least the date of previous product orders to estimate when products will need to be ordered again and sending emails to the customers associated with the identified products.

24. One or more computer readable media encoded with computer executable instructions which, when executed by a computer, implement a method of soliciting new orders for products previously ordered by customers, the method comprising
- retaining individual customer account information for a plurality of customers, the account information for each customer including at least an email address associated with the customer,
- retaining in electronic form a plurality of customized product designs for products previously ordered by the customers, each customized product design being associated with an individual customer account,
- searching the customer account information of at least a portion of the plurality of customers to identify one or more previously ordered products for which a new order will be solicited, and
- for each identified product from the one or more previously ordered products, sending an email to the email address associated with the customer account associated with the identified product the email displaying at least an image of the identified product, a promotional message soliciting a new order for the identified product, and at least one link allowing the customer to indicate interest in placing an order.

25. A computer-implemented method of soliciting orders for modified versions of products previously ordered by customers, the method comprising
- retaining individual customer account information associated with a plurality of customers, the account information for each customer including at least an email address associated with the customer,
- retaining in electronic form a plurality of customized product designs for products previously ordered by the customers, each customized product design being associated with an individual customer account,
- searching the customer account information of at least a portion of the plurality of customers to identify one or more previously ordered products to be updated with different content,
- without customer request, modifying the customized design of the one or more identified products by replacing at least a portion of the customized product content with different content to create a modified version of the previously ordered customized product design, and
- sending an email to the email address associated with the customer account associated with the previously ordered product, the email displaying at least the image of the modified product, a promotional message soliciting an order for the modified product and at least one link allowing the recipient of the email to indicate interest in placing an order.

26. The method of claim 25 wherein the content that is replaced comprises time-related content that has become at least partially obsolete since the date the previous product was ordered.

27. The method of claim 26 wherein the emails are sent at a time that is estimated to be during a time period when the customers will be interested in placing a new order for modified products updated with different time-related content.

28. The method of claim 26 wherein the time-related content that is replaced in the product design is selected from the group comprising a calendar, a schedule of events, and a list of holidays.

29. The method of claim 25 further comprising allowing a customer to initiate a purchase process for the modified product and receiving an order for the modified product from the customer.

30. The method of claim 25 further comprising allowing the customer to initiate an edit process such that the customer can make one or more changes to the modified design of the product and receiving an order for the modified product after the user has made one or more changes to the design of the modified product.

31. The method of claim 25 wherein the product design is modified only after the email is opened.

32. The method of claim 25 wherein the product design is modified prior to sending the email.

33. The method of claim 25 wherein the image of the modified product is sent to the customer s computer only after the email has been opened.

34. One or more computer readable media encoded with computer executable instructions which, when executed by a computer, implement a method of soliciting orders for modified versions of products previously ordered by customers, the method comprising
- retaining individual customer account information associated with a plurality of customers, the account information for each customer including at least an email address associated with the customer,
- retaining in electronic form a plurality of customized product designs for products previously ordered by the customers, each customized product design being associated with an individual customer account,
- searching the customer account information of at least a portion of the plurality of customers to identify one or more previously ordered products to be updated with different content,
- without customer request, modifying the customized design of the one or more identified products by replacing at least a portion of the customized product content with different content to create a modified version of the previously ordered customized product design, and
- sending an email to the email address associated with the customer account associated with the previously ordered product, the email displaying at least the image of the modified product, a promotional message soliciting an order for the modified product, and at least one link allowing the recipient of the email to indicate interest in placing an order.

* * * * *